Patented Nov. 21, 1933

UNITED STATES PATENT OFFICE 1,936,500

RUBBER COATED FABRIC

John Russum Couture, Fairfield, Conn., assignor to E. I. du Pont de Nemours & Company, Wilmington, Del., a corporation of Delaware No Drawing. Application February 3, 1931
Serial No. 513,233

11 Claims. (Cl. 91—70)

This invention relates to a process for manufacturing improved products comprising fabric sheet material having a top coat of asphalt varnish. More particularly the invention relates to a process for manufacturing an improved artificial leather and still more particularly to the production of rubber coated fabrics finished with an improved top coat of baked asphalt varnish.

This case is a continuation in part of my Patent 1,795,199 of March 3, 1931. In this patent I have disclosed the manufacture of improved coated products comprising sheet material having a coating made from asphalt varnish, and more especially rubber coated fabric provided with a top coat of asphalt varnish. I have now discovered that the products just referred to are notably improved when steam refined asphalts are used in the manufacture of the coating composition.

This invention has as an object a process for manufacturing improved artificial leather or fabric sheet material covered with a film of asphalt varnish characterized by high luster and exceptional durability. A still further object resides in a process for the production of an improved article of manufacture comprising a rubber coated fabric having a top coat of this baked asphalt varnish.

These objects are accomplished by using in the manufacture of the coating compositions, asphalts which have been steam refined, especially steam refined petroleum residue asphalts, as distinguished from asphalts which have been refined by other methods, as for instance, by blowing with air. In the practice of the invention I prefer to use varnishes prepared by blending steam refined petroleum residue asphalts with drying oils.

These coating compositions may be applied as single coat varnishes directly over the rubber, or they may be applied over an intermediate coat of oil varnish, or over an intermediate coat which has the same composition as the final coat. It is generally preferred to use steam refined petroleum residue asphalt-drying oil varnishes containing driers consisting of metallic salts such as the resinates or linoleates of lead, manganese, or cobalt. Bodied or unbodied oils may be used in the preparation of the varnishes but when Chinawood oil is used it should be bodied sufficiently to prevent wrinkling of the varnish films. When linseed oil is used, care should be taken not to body the oil to too high a viscosity, since highly bodied linseed oil is difficultly compatible with steam refined petroleum residue asphalts.

The process of the present invention finds wide application in the manufacture of rubber coated fabric for automobile top material. In the one-coat system, which is the simplest form of my invention, the coat of asphalt varnish is applied over the uncured rubber and then subjected to heating at a suitable temperature and for a sufficient time to vulcanize the rubber and to thoroughly fuse the asphalt film. By this treatment I obtain on the surface of the goods a smooth, continuous film which is substantially inert and which remains for a long time unaffected by sunlight. The temperature and time of cure depend on the rubber compound, and especially on the kind and quantity of vulcanizing agent used. As a rule, the temperature will lie between 240° F. and 275° F., and the time of cure will be from 30 minutes to 3 hours.

When using my two-coat system, I first apply to the uncured rubber an intermediate coat of varnish which is preferably more flexible than the steam refined asphalt varnish used as the final coat. Excellent results are obtained, however, through application of two coats of the asphalt varnish. The intermediate coat may be air-dried, if desired, that is, dried at room temperature, but it is more advantageous from the cost standpoint to use a "force-dry", that is, dry at an elevated temperature, but below the vulcanizing temperature of the rubber. Thus, I usually dry the first coat varnish by heating it up to 250° F. to 270° F. in one hour, after which I apply the final asphalt varnish and finish by baking at a temperature of about 240° F. to 275° F. for such time as is required to complete the vulcanization of the rubber.

In some cases it is advantageous, after applying the intermediate varnish coat, to bake at the vulcanizing temperature for a portion of the vulcanizing period and to complete the vulcanization of the rubber by baking at the same temperature after the final coat of asphalt varnish has been applied. This procedure somewhat shortens the total time required to complete the process, but it is important that care should be taken on the one hand to avoid overvulcanization of the rubber, and on the other hand that the final coat should receive not less than about one hour's treatment at the full vulcanizing temperature in order to produce the best results and to properly condition the asphalt varnish film. However, I do not wish to limit my invention to a process which involves baking the final asphalt coat of a two-coat system, as the final coat of asphalt varnish may be air-dried or dried at only slightly elevated temperatures. The method is not, however, so desirable because the luster retention of the finish is somewhat reduced when the air-dry procedure is followed.

The two-coat system is preferred to the one-coat system, especially over a rubber coated fabric, because it has greater flexibility and retains its gloss for a longer time. Without limiting myself thereto, I believe this is due to the elastic coat of intermediate varnish acting as a buffer or bridge between the extremely elastic rubber compound and the comparatively inelastic asphalt varnish film.

The asphalt varnish which forms the final coat in all modifications of my process may be a straight solution of steam refined asphalt in a suitable volatile solvent such as mineral spirits, benzene, toluene, or turpentine, but I prefer to incorporate with the asphalt a drying oil such as linseed oil, China-wood oil, fish oils, etc., in addition to the thinners mentioned above, so as to decrease the brittleness of the asphalt when it is spread in a thin film. From two and one-half to seven and one-half gallons of oil to 100 pounds of asphalt is usually sufficient for this purpose, but in some cases where a high degree of elasticity is desired I may use with good results as high as 20 gallons of oil per 100 pounds of asphalt. With raw linseed oil, 30 to 40 gallon varnishes have been prepared which are satisfactory for use in certain applications. Varnishes designed for use under severe conditions of weathering, however, should lie below 20 gallons and, preferably, below ten gallons in oil length. The term "gallon" is used herein as designating a weight of eight pounds of oil per 100 pounds of asphalt. For example, a five gallon-asphalt-oil varnish contains approximately 40 pounds of oil to 100 pounds of asphalt.

These varnishes may be used either with or without driers, but it has been found that more satisfactory varnishes can be obtained if solutions containing the resinates or linoleates of cobalt, lead and manganese are used.

The term "steam refined asphalt varnishes" used in this specification is intended to designate coating compositions in which the principal film-forming constituent is steam refined asphalt, with or without other ingredients such as drying oils, pigments and natural or synthetic resins.

The following examples are illustrative of suitable compositions for application by the processes described above.

EXAMPLE 1

ONE-COAT SYSTEM

*Final coat—asphalt varnish*

| | Per cent |
|---|---|
| Steam refined petroleum residue asphalt | 25 |
| Mineral thinner | 75 |

EXAMPLE 2

ONE-COAT SYSTEM

*Final coat—asphalt varnish*

| | Per cent |
|---|---|
| Steam refined petroleum residue asphalt | 20 |
| Bodied China-wood oil | 20 |
| Turpentine substitute | 60 |

EXAMPLE 3

TWO-COAT SYSTEM

*Intermediate coat—oil varnish*

| | Per cent |
|---|---|
| Carbon black | 2.5 |
| Bodied linseed oil | 44.5 |
| Lead resinate drier (containing 10% Pb) | 3.2 |
| Turpentine substitute | 49.8 |

*Final coat—asphalt varnish*

| | Per cent |
|---|---|
| Steam refined petroleum residue asphalt | 25 |
| Turpentine substitute | 75 |

EXAMPLE 4

TWO-COAT SYSTEM

*Intermediate coat—oil varnish*

Same as intermediate coat in Example 3.

*Final coat—asphalt varnish*

| | Per cent |
|---|---|
| Steam refined petroleum residue asphalt | 20 |
| Bodied China-wood oil | 12 |
| Lead resinate (containing 10% Pb) | 0.2 |
| Manganese resinate (containing 6.63% Mn) | 0.1 |
| Turpentine substitute | 67.7 |

EXAMPLE 5

TWO-COAT SYSTEM

*Intermediate coat—oil varnish*

Same as intermediate coat in Example 3.

*Final coat—asphalt varnish*

| | Per cent |
|---|---|
| Steam refined petroleum residue asphalt | 25 |
| Bodied China-wood oil | 5 |
| Mineral thinner | 70 |

EXAMPLE 6

TWO-COAT SYSTEM

*Intermediate coat—oil varnish*

Same as intermediate coat in Example 3.

*Final coat—asphalt varnish*

| | Per cent |
|---|---|
| Steam refined petroleum residue asphalt | 41.66 |
| Turpentine substitute | 41.53 |
| Bodied China-wood oil | 16.67 |
| Cobalt linoleate (containing 5.80% cobalt) | 0.14 |

The asphalt varnishes comprising this invention are useful for finishing rubber coated fabrics such as are used on automobile deck material, for finishing rubber upholstery, for top dressings, etc.

My process has been described in connection with rubber coated fabrics, since these represent the preferred embodiments of the invention, but it is apparent that the finishes disclosed herein may be applied as a top coat to flexible sheet material in general, such as cloth and paper fabrics or leather. My improved asphalt coating composition may also be used for the production of artificial leather by finishing coated materials other than rubber coated materials such as nitrocellulose coated and linseed coated fabrics. The coated sheet material, over which the asphalt varnish is applied, refers to fabrics such as cloth or paper coated with a layer of material such as rubber or pyroxylin by spraying, spreading, calendering, or by other known methods of application.

For the production of a film sufficiently flexible to form a satisfactory top coat for fabrics and at the same time possessing a high degree of durability, the asphalt, as I have discovered, should have a fairly high melting point with low penetration. The greater hardness possessed by steam refined petroleum residue asphalt having a melting point within the desired range as compared to a blown asphalt having the same melting point may be observed from the fact that steam refined petroleum residue asphalt, having a melting point of 175° F. to 180° F., showed a penetration value of 13±1, whereas the penetration value of the blown asphalt subjected to the same test was 25±1. Likewise a steam refined petroleum residue asphalt having a melting point of 215° F.

had a penetration value of but 5 as compared to 17 for a blown asphalt of the same melting point. The melting points were determined by the ball and ring method as set forth in A. S. T. M. Standards, 1921, page 944, under the serial designation D—36—21. Penetrations were determined as set forth in A. S. T. M. Standards, 1930, page 647, under the serial designation D—5—25.

The process herein disclosed of manufacturing products of sheet material coated with steam refined asphaltic materials, that is, asphalts from which the lower fractions have been removed by steam throughout the process of refining rather than by treatment with air, yields products having a coating exhibiting better durability and retention of luster than similar products coated with compositions containing asphalts which have been refined by blowing with air. Asphalts which have been steam refined in the initial stages and then blown with air are also less satisfactory than asphalts which are treated with steam throughout the refining process.

Comparative tests on the durability of varnishes containing steam refined petroleum residue asphalts and varnishes containing blown petroleum residue asphalts show that the former varnishes are the most desirable. Thus, I have found varnishes containing steam refined petroleum residue asphalts in five gallon lengths to be at least twice as durable as those containing the same amount of a blown petroleum residue asphalt. Seven and one-half gallon varnishes containing steam refined petroleum residue asphalt are at least 50% more durable than those containing blown petroleum asphalts. Of all the gallon lengths at which I have evaluated the two types of asphalt, I have found the varnishes made from steam refined petroleum residue asphalt to be the most durable. The differences in durability between the two types of varnishes, as will be observed from the above comparison, becomes narrower as the gallon length of the varnish increases. Unmodified films of steam refined petroleum residue asphalts are also more durable than unmodified films of blown petroleum residue asphalts.

As many apparently widely different embodiments of this invention may be made without departing from the spirit and scope thereof, it is to be understood that I do not limit myself to the specific embodiments thereof except as defined in the appended claims.

I claim:

1. A process for making artificial leather which comprises applying to fabric sheet material a final coating comprising steam refined petroleum residue asphalt varnish, and baking said coating, said asphalt having a high melting point with low penetration value.

2. A process for making artificial leather which comprises applying to fabric sheet material a final coating of a varnish comprising steam refined asphalt, and baking said coating.

3. A process for making artificial leather which comprises applying to fabric sheet material a final coating of a varnish comprising steam refined asphalt, a drying oil and a solvent, and baking said coating.

4. A process for finishing coated fabric sheet material which comprises applying over the coating on the fabric a final coat of steam refined asphalt varnish and baking it at a temperature higher than the softening point of the asphalt.

5. A process for finishing coated fabric sheet material which comprises applying over the coating on the fabric a final coat of steam refined petroleum residue asphalt varnish, and baking it at a temperature higher than the softening point of the asphalt.

6. A process for finishing rubber coated fabric sheet material which comprises applying over the rubber a final coat of steam refined asphalt varnish and drying said asphalt coating.

7. A process for finishing rubber coated fabric sheet material which comprises applying over the rubber a final coat of steam refined asphalt varnish and baking it at a temperature which is higher than the softening point of the asphalt.

8. A process for finishing rubber coated fabric sheet material which comprises applying over the rubber a final coat of steam refined asphalt varnish and baking it at the vulcanizing temperature of the rubber compound.

9. A process for making artificial leather which comprises applying over a textile fabric a layer of uncured rubber, applying a coating of steam refined petroleum residue asphalt varnish thereover, and baking the resulting product.

10. A process of finishing rubber coated fabric sheet material which comprises applying over the rubber a final coat of varnish comprising drying oil and steam refined petroleum residue asphalt in the ratio of not more than 160 pounds of oil to 100 pounds of asphalt, and baking the resulting product.

11. A process for finishing rubber coated fabric sheet material which comprises applying over the rubber an intermediate coat of varnish, and applying over said intermediate coat a final coat of steam refined petroleum residue asphalt, said intermediate coat being capable of yielding a more flexible film than said final coat, and baking the resulting product.

JOHN RUSSUM COUTURE.